(12) United States Patent
Hsu et al.

(10) Patent No.: US 7,090,477 B2
(45) Date of Patent: Aug. 15, 2006

(54) ELECTROMAGNETIC COAXIAL DRIVING INJECTION APPARATUS

(75) Inventors: Chia-Chun Hsu, Keelung (TW);
Yong-Chen Chung, Kaohsiung (TW);
Chia-Hung Lin, Hsinchu (TW);
Wen-Hung Feng, Pingchen (TW);
Ming-Chi Chen, Ilan (TW)

(73) Assignee: Industrial Technology Research Institute, Hsinchu (TW)

( * ) Notice: Subject to any disclaimer, the term of this patent is extended or adjusted under 35 U.S.C. 154(b) by 364 days.

(21) Appl. No.: 10/405,319

(22) Filed: Apr. 1, 2003

(65) Prior Publication Data

US 2004/0071810 A1   Apr. 15, 2004

(30) Foreign Application Priority Data

Oct. 9, 2002   (TW) ............... 91216094 U

(51) Int. Cl.
*B29C 45/50* (2006.01)
(52) U.S. Cl. .................. 425/3; 425/562; 425/564; 425/550; 425/587; 264/40.5
(58) Field of Classification Search ............ 425/3, 425/562, 564, 550, 587; 264/40.5
See application file for complete search history.

(56) References Cited

U.S. PATENT DOCUMENTS

| | | | | |
|---|---|---|---|---|
| 4,571,528 A | * | 2/1986 | McGee et al. | 318/138 |
| 4,895,505 A | * | 1/1990 | Inaba et al. | 425/145 |
| 5,863,567 A | * | 1/1999 | Klaus | 425/145 |
| 6,051,896 A | * | 4/2000 | Shibuya et al. | 310/12 |
| 6,821,103 B1 | * | 11/2004 | Tokuyama et al. | 425/145 |
| 2004/0161485 A1 | * | 8/2004 | Kobayashi | 425/3 |

FOREIGN PATENT DOCUMENTS

EP   1095753 A1 *  5/2001

* cited by examiner

*Primary Examiner*—Robert Davis
*Assistant Examiner*—G. Nagesh Rao
(74) *Attorney, Agent, or Firm*—Pro-Techtor Int'l Services

(57) ABSTRACT

An electromagnetic coaxial driving injection apparatus, having a linear motor for driving injection and a rotation motor for metering. The linear motor and the rotation motor of both the injection and metering motors and an injection screw are set on a common axis. A connecting device connects moving parts of the motors with the injection screw. Stationary parts of the motors are fastened on a frame and forward-backward moving unit, not moving during injection and metering. Due to the arrangement of the moving parts and the injection screw on a single axis, moving parts are lessened, and transmission losses are minimized. Since the number of structural parts is low, only the moving parts of the motors move during injection while the stationary parts thereof remain at rest, thus greatly reducing inertia. Furthermore, since the moving axis of the injection screw and the injection screw are linked, without being connected with stators or other structural parts, injection is performed with minimal friction, enhancing effectiveness of the apparatus.

The main characteristic of the present invention is that, due to direct driving of injection without mechanical transmission, the effects of hysteresis and backlash are avoided. Furthermore, inertia and friction are reduced. The present invention increases the response and reappearance of the system.

9 Claims, 4 Drawing Sheets

ELECTROMAGNETIC COAXIAL DRIVING INJECTION APPARATUS

BACKGROUND OF THE INVENTION

With steady technological progress, demands on precision of molding are increasing by the day. Of particular importance are speed and aiming precision of injection molding machines. Previously, injection pressure was generated by hydraulic devices or servomotors. Mechanic transmission, however, effects hysteresis and backlash, so that injection is not aimed precisely and demands of high technology are not met. During metering, the driving unit of the injection screw moves along with the injection driving device, greatly increasing inertia. In addition, the accuracies at the end of movement is reduced, thereby reducing the precision in molding. Thus, the present invention developed to eliminate the positional inaccuracies and injectional backlash generated by mechanic transmission and high inertia, thereby achieving high speed and precision molding.

1. Basic Object of the Present Invention

An electromagnetic coaxial driving injection apparatus is provided, comprising an injection screw; an injection and metering driving device coaxial therewith, at least one connecting unit, and at least one bearing. When the injection screw performs a linear movement, only rotors of motors move along, while stators of the motors remain at rest, greatly reducing inertia. Both injection and metering are directly driven, without any transmission by belt or gears, so that no backlash and hysteresis occur. Since the number of structural parts are lessened, accumulating inaccuracies due to manufacturing and assembly are avoided. The present invention thus meets demands for high speed and precision.

2. Description of Related Art

A conventional injection system of an injection molding machine comprises an injection driving device for driving a linear movement of the injection system and a metering device for driving and controlling a rotating movement of an injection screw of the injection system to perform metering.

Linear driving for injection systems of injection molding machines is performed either hydraulically or electrically. Hydraulic devices allow readily to implement a linear driving force easily. However, due to the compressibility behavior of fluid and change of properties thereof with temperature, positioning accuracy is comparatively poor. Furthermore, noise is generated during operation, cleaning is difficult and power consumption is high. An electric motor generating a rotational motion, on the other hand, consumes less power than a hydraulic device and is accurately controllable, but transformation of a rotational movement into a linear movement is needed. Therefore, a complicated mechanism of belt and pulleys is required. This causes the structure to be complicated and requirement for space to be high.

Using a linear motor as a prime driving force for driving injection not only saves energy, but has also mechanical advantages, as compared to a rotational motor. In addition, lower inertia, simple structure, speed control and positional maneuverability are obtained. Several designs using linear motors for driving injection have already been disclosed, as further explained in the following.

U.S. Pat. No. 4,895,505 uses a linear motor for driving injection and a coaxial rotation motion for metering, both of which are set on an injection screw and connected by mechanical means.

U.S. Pat. No. 6,051,896 and Japan patent publication no. 2001-300967 both disclose a linear motor for an injection driving device. The motor has a shape like a rectangular tube, in each publication having a particular design of its own, with stators and rotors distributed on the periphery of a rectangle. A metering part is provided, with U.S. Pat. No. 6,051,896 using a rotation motor directly driving an injection screw at a rear end thereof, and Japan patent publication no. 2001-300967 using a rotation motor indirectly driving an injection screw via a belt and a pulley.

Japan patent publications no. 2001-124169 and 2002-079555 both disclose at least two linear motors, connected in series or parallel and linked mechanically for driving injection. As to metering parts, Japan patent publication no. 2001-124169 uses a rotation motor which directly drives an injection screw and is placed at a rear end thereof, whereas Japan patent publication no. 2002-079555 uses a rotation motor indirectly driving an injection screw via a belt and gears.

Above publications all describe one linear motor or at least two linear motors for driving injection; however, for the metering part, a rotation motor is used, performing direct or indirect driving. Rotor and stator of the metering motor move along with the injection movement. Therefore, the injection driving motor not only drives the injection screw and a plastics melting device, but also the metering motor, which increases inertia. If, as partly taught in the patent publications, the stator of the metering motor does not move along with the injection movement, a mechanical transmission system is required, such as a spindle, which causes friction and thus increases load on the motor and reduces mechanical effectiveness thereof. Furthermore, mechanical transmission systems, like belts, pulleys and spindles have backlash, hampering accuracy of positioning and thus impairing precision of manufacturing products. Since the design of the present invention minimizes friction of the assembly and structural parts, good responsive behavior is achieved, and speed response as well as controlling precision are improved.

Moreover, in the driving system of the injection system of the present invention, there are no mechanically transmitting connected parts, so that mechanical impairing of the machine by friction is reduced and the negative effect of backlash between a transmission belt and transmitting parts is avoided, resulting in increased repetitive good behavior.

SUMMARY OF THE INVENTION

The present invention is based on the reducing of systematic inertia and friction, providing a novel magnetic coaxial injection apparatus. In the prime driving force, we use a newly designed linear driving apparatus (including more than one liner motor) and rotational driving apparatus, to provide a driving force respectively for injection and metering. The moving parts of both form a common axis with the injectional screw. During the injection movement, only moving of the motors, along with the injection screw and a plastics melting device need to be driven, thus greatly reducing inertia. Furthermore, since the movements of the motors and the injection screw are tightly linked, not being connected with stators or other structural parts of the injection apparatus, the movement of the injection screw is performed with minimal friction.

A main feature of the present invention is that, due to direct driving of injection without mechanical transmission, the effects of hysteresis and backlash are avoided. Furthermore, inertia and friction are reduced. In addition, the newly designed driving apparatus greatly reduce the systematic inertia and frictions, thereby increasing the response and reappearance of the system.

The present invention can be more fully understood by reference to the following description and accompanying drawings.

DETAILED DESCRIPTION OF THE PREFERRED EMBODIMENT

Figure 1:
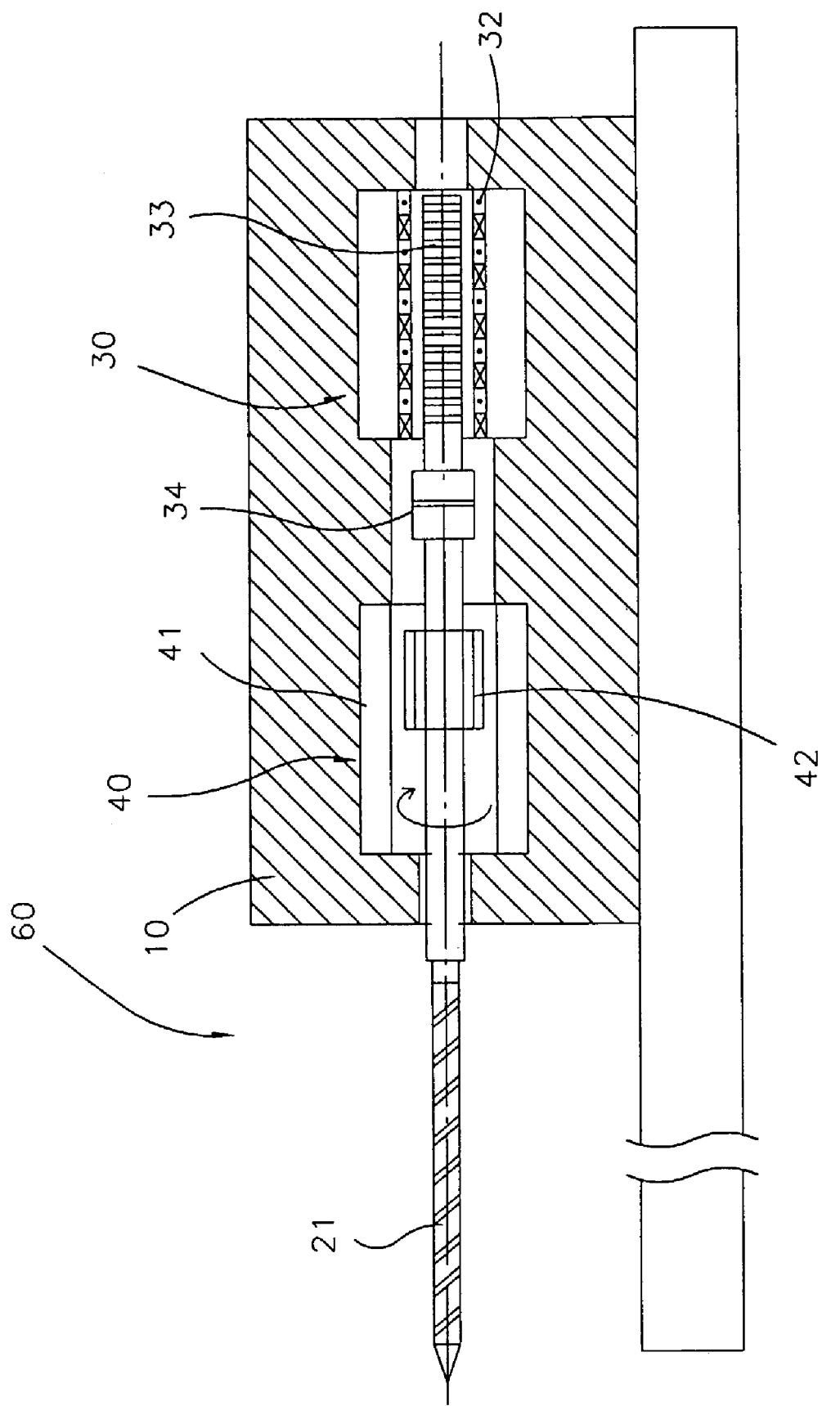
FIG. 1 is a complete view of the electromagnetic coaxial driving injection apparatus of the present invention when assembled.
Figure 2:
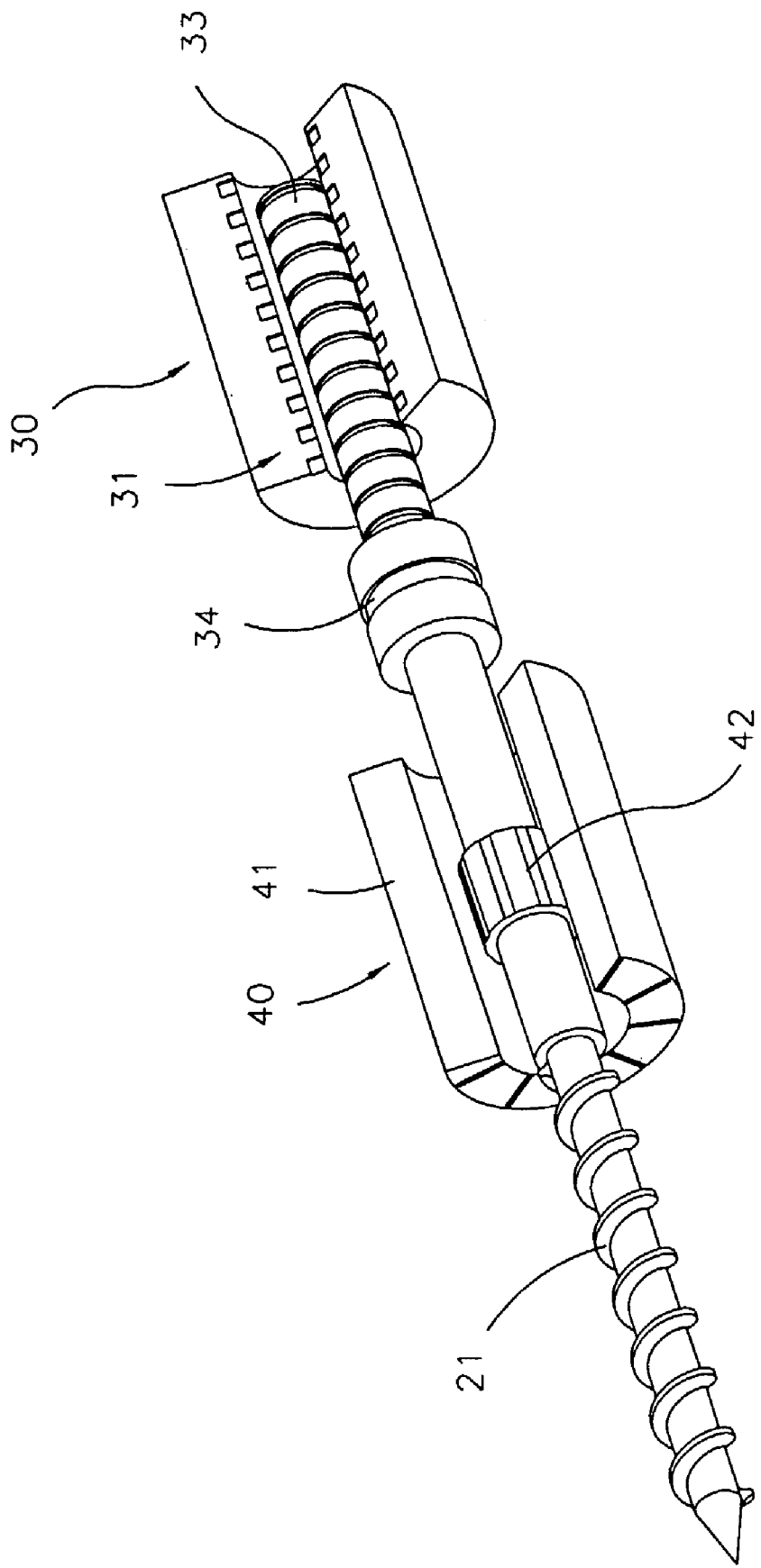
FIG. 2 is a perspective view of the electromagnetic coaxial driving injection apparatus of the present invention.

As shown in FIGS. 1 and 2, the electromagnetic coaxial driving injection apparatus of the present invention mainly comprises: a frame 10; an injection screw 21; an injection driving device 30; and a metering driving device 40. The injection screw 21 has a screwed part and an unscrewed part that form a single body or two distinct bodies.

The injection driving device 30 drives the injection screw 21 to perform a linear injection movement on a common axis. In the embodiment shown the injection driving device 30 is a linear motor having a stator 31, constituting a fixed part, and a rotor 33 which is linearly movable. The injection stator 31 forms a tube, mounted inside the frame 10, a front end thereof being connected with the injection screw 21 via a connecting device 34. Alternatively, a connection is established by threads or a single body is formed. The injection rotor 33 and the injection screw 21 share a common symmetry axis.

Figure 4:
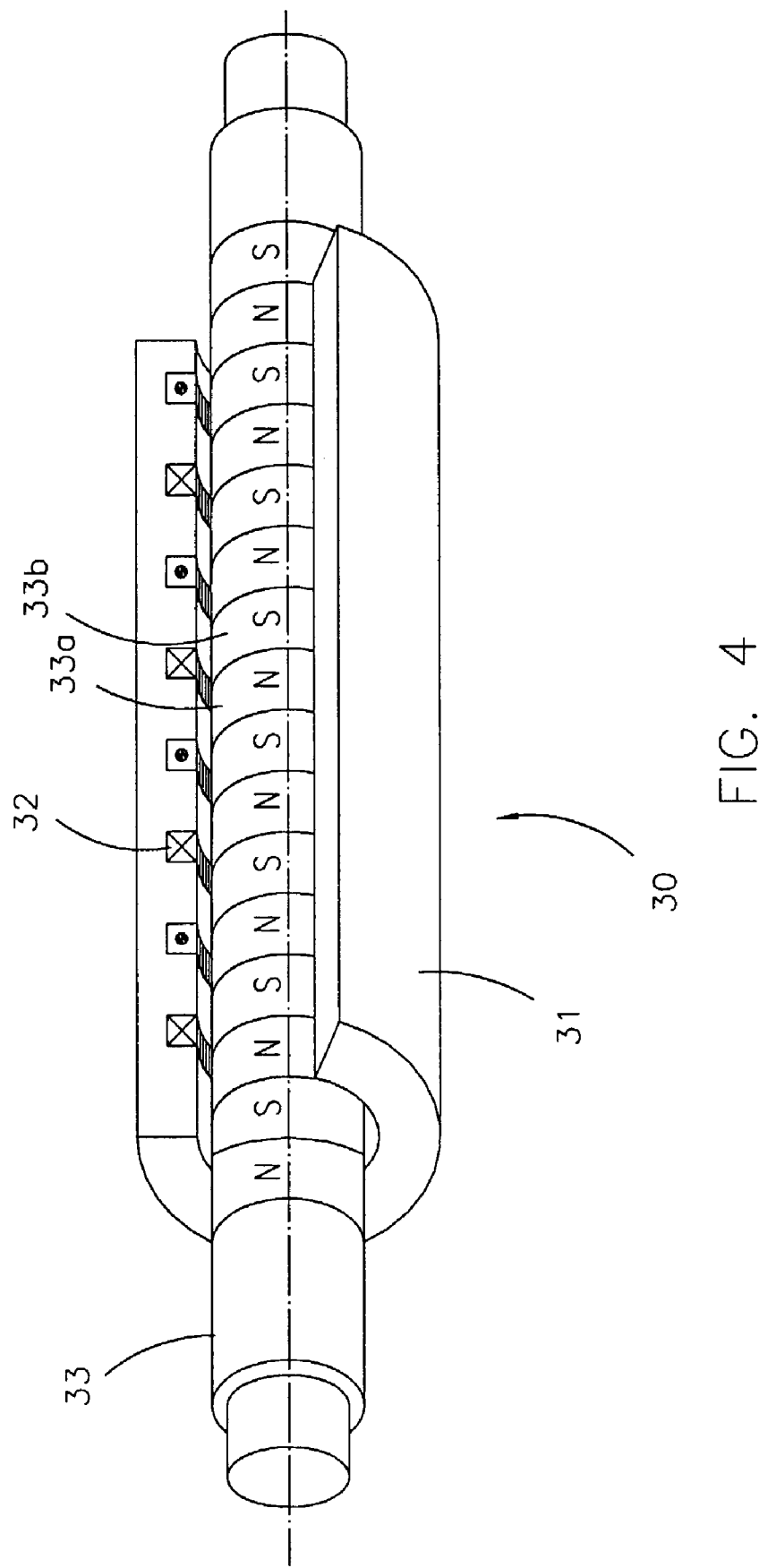
FIG. 4 is a perspective view of the injection driving device of the present invention.

Referring to FIG. 4, in the embodiment shown the injection stator 31 has a plurality of linearly arranged longitudinal coils 32 around a common axis. The injection rotor 33 of the movable part has a plurality of linearly arranged longitudinal permanent magnets 33a, 33b with alternating polarities. When an electric current passes through the longitudinal coils 32 of the injection stator 31, a magnetic field is generated and the injection rotor 33 is driven in a linear movement. Since the injection rotor 33 via the connecting device 34 is connected with the injection screw 21, the linear movement of the injection rotor 33 drives the linear injection movement of the injection screw 21.

Figure 3:
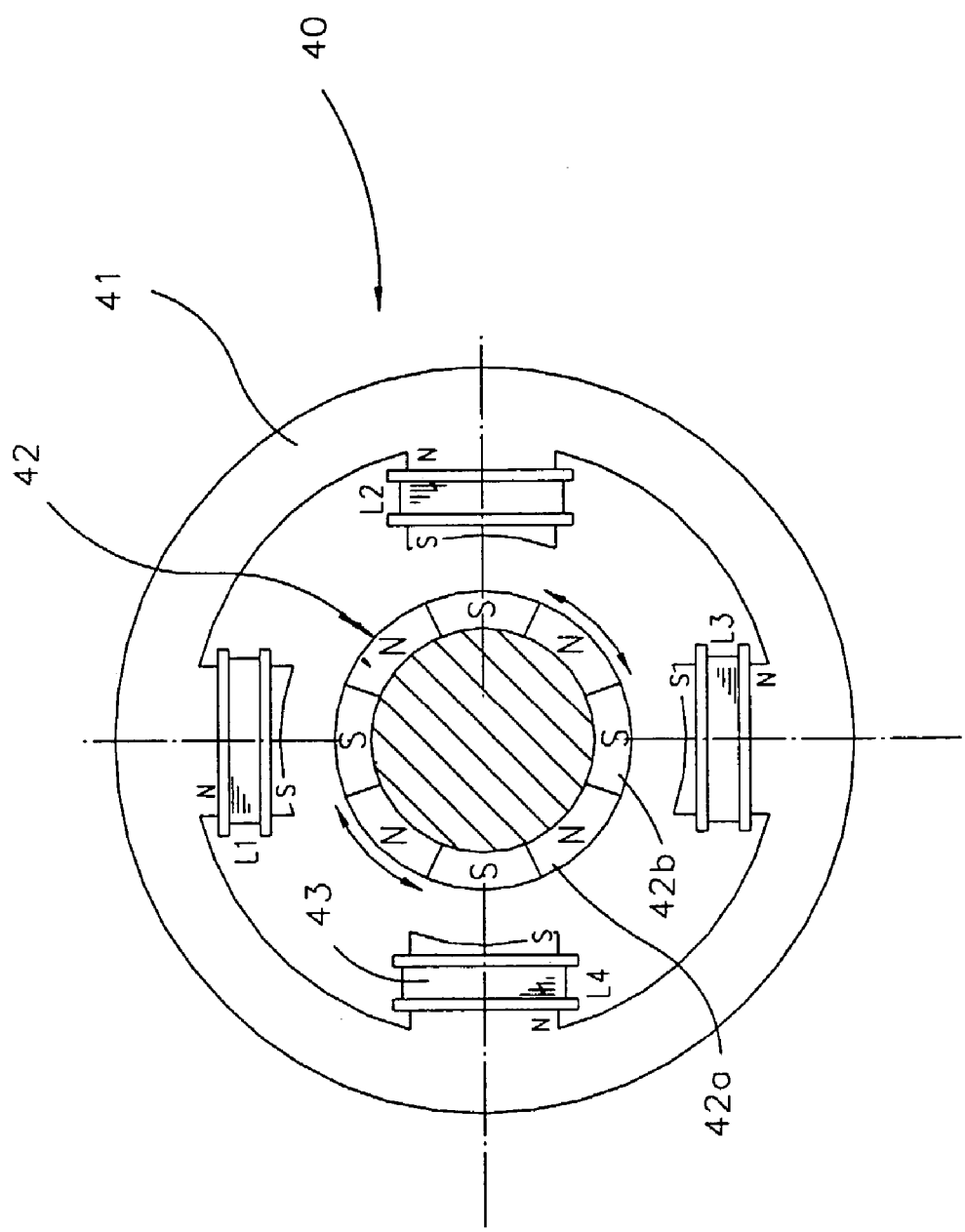
FIG. 3 is a schematic illustration of the metering driving device of the present invention.

Referring to FIGS. 1 and 3, the metering driving device 40 drives the injection screw 21 to perform a rotating movement. The metering driving device 40 has a metering stator 41, fixed inside the frame 10, and a coaxial metering rotor 42, mounted on the injection screw 21 and surrounding the metering rotor 42. The metering stator 41 has a plurality of transversal coils 43, and the metering rotor 42 has a plurality of transversal permanent magnets 42a, 42b. When an electric current passes through the transversal coils 43, a magnetic field is generated and attractive and repulsive forces to the transversal permanent magnets 42a, 42b cause the metering rotor 42 to rotate. Of course, the positions of the injection driving device 30 and the metering driving device 40 are interchangeable within the range of the present invention.

A characteristic of the present invention lies in that the metering stator 41 surrounds the metering rotor 42, having a length that exceeds the distance covered by the metering rotor 42 in the linear movement thereof. Thus the metering stator 41 covers the metering rotor 42 during the entire injection path of the injection screw 21, so that the metering rotor 42 is exposed to and driven by the magnetic field of the metering stator 41 during the metering process without interruption.

Within the metering driving device 40, only the metering rotor 42 and the injection screw 21 are connected, while the metering stator 41 is separated from the metering rotor 42, being fixed on the frame 10. Therefore the injection system 60, while metering or injecting plastics, has the injection and rotating movements performed only by the metering rotor 42, so that inertia of moving parts is minimized.

By the arrangement described above, the number of moving parts is reduced and inertia of the injection system 60 is minimized. Therefore, any hysteresis of movement is reduced and high precision of movement is achieved. The injection driving device 30 and the metering driving device 40 both work by direct driving, eliminating the need for mechanical transmission systems, thus reducing friction and backlash. Therefore, high accuracy of positioning and rotating the injection system 60 is achieved.

While the invention has been described with reference to a preferred embodiment thereof, it is to be understood that modifications or variations may be easily made without departing from the spirit of this invention which is defined by the appended claims.

The invention claimed is:

1. An electromagnetic coaxial driving injection apparatus, comprising:
   an injection screw;
   a linear injection driving device, comprising a linear motor, with
     a linear stationary part, and
     a linear moving part interior of said linear stationary part, being rotatable within said linear stationary part, and having a common axis with said injector screw, for driving said injection screw in a linear movement along a main axis thereof;
   a metering driving device, comprising a rotary motor having
     a stator with transversal field coils, and
     a rotor, interior of said stator, having a shaft coaxial with and connected to said injector screw, said rotor being linearly moveable in an axial direction relative to said stator, driving said injection screw in a rotating movement for metering; and
   a connecting unit, connecting said linear moving part of said linear driving device and said rotor of said metering driving device;
   wherein said linear moving part and said rotor together with said injector screw, perform said linear and rotating movements against said stationary parts.

2. The electromagnetic coaxial driving injection apparatus according to claim 1, wherein said linear movement of said injection driving device and said rotating movement of said metering driving device are driven by brush-less motors, which are driven by magnetic fields generated by coils on said linear stationary part and said stator with permanent magnets on said linear moving part and said rotor.

3. The electromagnetic coaxial driving injection apparatus according to claim 1, wherein said stationary parts are hollow bodies, mounted on a frame.

4. The electromagnetic coaxial driving injection apparatus according to claim 1, wherein said stator is at least equal to the length of said rotor added to the length of axial travel of said linear moving part, so that said rotor is moveable linearly relative to said stator.

5. The electromagnetic coaxial driving injection apparatus according to claim 4, wherein said rotor has a plurality of permanent magnets and is connected with a rotor of said linear driving device to form an integral body, further being connected with said injection screw.

6. The electromagnetic coaxial driving injection apparatus according to claim 4, wherein said stator surrounds said rotor, generating a magnetic field which interacts with a magnetic field of said rotor, thus driving said rotating movement.

7. The electromagnetic coaxial driving injection apparatus according to claim 4, wherein said stator has a plurality of coils, forming a hollow body, which is mounted on a frame, so that said rotor moves internally in said stator, driven by the magnetic field.

8. The electromagnetic coaxial driving injection apparatus according to claim 1, wherein the positions of linear driving device and said metering driving device are interchangeable.

9. The electromagnetic coaxial driving injection apparatus according to claim 1, wherein said linear moving part of said linear driving device and said rotor of said metering driving device are integral with each other and with said injection screw, forming an integral body, thus saving said connecting unit.

* * * * *